(12) United States Patent
Lim et al.

(10) Patent No.: US 12,309,411 B2
(45) Date of Patent: *May 20, 2025

(54) METHOD AND DEVICE FOR SIMPLIFYING THE ENCODING AND DECODING OF ULTRA-HIGH DEFINITION IMAGES

(71) Applicants: ELECTRONICS AND TELECOMMUNICATIONS RESEARCH INSTITUTE, Daejeon (KR); UNIVERSITY-INDUSTRY COOPERATION GROUP OF KYUNG HEE UNIVERSITY, Yongin-si (KR)

(72) Inventors: Sung Chang Lim, Daejeon (KR); Hae Chul Choi, Daejeon-si (KR); Se Yoon Jeong, Daejeon-si (KR); Suk Hee Cho, Daejeon-si (KR); Hui Yong Kim, Daejeon-si (KR); Jin Ho Lee, Daejeon-si (KR); Ha Hyun Lee, Seoul (KR); Jong Ho Kim, Daejeon-si (KR); Jin Soo Choi, Daejeon-si (KR); Jin Woong Kim, Daejeon-si (KR); Gwang Hoon Park, Daejeon-si (KR); Kyung Yong Kim, Suwon-si (KR); Dong Gyu Sim, Seoul (KR); Seoung Jun Oh, Seongnam-si (KR)

(73) Assignees: Electronics and Telecommunications Research Institute, Daejeon (KR); UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/363,282

(22) Filed: Aug. 1, 2023

(65) Prior Publication Data
US 2024/0022753 A1  Jan. 18, 2024

Related U.S. Application Data

(63) Continuation of application No. 16/533,921, filed on Aug. 7, 2019, now Pat. No. 11,770,550, which is a
(Continued)

(30) Foreign Application Priority Data

Dec. 7, 2010 (KR) .................. 10-2010-0124368

(51) Int. Cl.
*H04N 19/593* (2014.01)
*H04N 19/11* (2014.01)
(Continued)

(52) U.S. Cl.
CPC ............. *H04N 19/50* (2014.11); *H04N 19/11* (2014.11); *H04N 19/132* (2014.11);
(Continued)

(58) Field of Classification Search
CPC ...... H04N 19/50; H04N 19/11; H04N 19/132; H04N 19/147; H04N 19/169; H04N 19/176; H04N 19/46; H04N 19/593
(Continued)

(56) References Cited

U.S. PATENT DOCUMENTS 6,584,226 B1  6/2003  Chaddha et al.
7,289,674 B2  10/2007  Karczewicz
(Continued)

FOREIGN PATENT DOCUMENTS

CN   101336549 A   12/2008
JP   2008-17225 A   1/2008
(Continued)

OTHER PUBLICATIONS

ITU-T Telecommunication Standardization Sector of ITU: H.264 Series H: Audiovisual and Multimedia Systems, Infrastructure of audiovisual services—Coding of moving video—Advanced video coding for generic audiovisual services—Mar. 2005. (343 pages, in English).

*Primary Examiner* — Albert Kir
(74) *Attorney, Agent, or Firm* — NSIP Law

(57) ABSTRACT

Provided are an encoding device using predictive coding in a screen and a method thereof, and a decoding device and a method thereof. The encoding device is capable of generating a prediction block of a current block according to one
(Continued)

of methods for generating a plurality of predetermined prediction blocks, and outputting at least one of encoding information and differential blocks as bitstream by entropy encoding according to whether differential blocks are encoded or not.

20 Claims, 11 Drawing Sheets

Related U.S. Application Data continuation of application No. 15/712,835, filed on Sep. 22, 2017, now abandoned, which is a continuation of application No. 13/990,190, filed as application No. PCT/KR2011/009167 on Nov. 29, 2011, now Pat. No. 9,794,556.

(51) Int. Cl.
  *H04N 19/132*  (2014.01)
  *H04N 19/147*  (2014.01)
  *H04N 19/169*  (2014.01)
  *H04N 19/176*  (2014.01)
  *H04N 19/46*   (2014.01)
  *H04N 19/50*   (2014.01)

(52) U.S. Cl.
  CPC ......... *H04N 19/147* (2014.11); *H04N 19/169* (2014.11); *H04N 19/176* (2014.11); *H04N 19/46* (2014.11); *H04N 19/593* (2014.11)

(58) Field of Classification Search
  USPC ................ 375/240.12, 27; 382/236, 238
  See application file for complete search history.

(56) References Cited

U.S. PATENT DOCUMENTS

| | | | |
|---|---|---|---|
| 8,208,544 B2 | 6/2012 | Song et al. | |
| RE43,567 E | 8/2012 | Sun et al. | |
| 8,290,041 B2 | 10/2012 | Suzuki et al. | |
| 9,143,787 B2 | 9/2015 | Kim et al. | |
| 9,794,556 B2 | 10/2017 | Lim et al. | |
| 10,097,856 B2 | 10/2018 | Takahashi et al. | |
| 2004/0086047 A1 | 5/2004 | Kondo et al. | |
| 2005/0135484 A1 | 6/2005 | Lee et al. | |
| 2005/0196062 A1 | 9/2005 | Cho et al. | |
| 2006/0115168 A1 | 6/2006 | Kobayashi | |
| 2007/0053438 A1 | 3/2007 | Boyce et al. | |
| 2007/0121723 A1 | 5/2007 | Mathew et al. | |
| 2007/0140353 A1 | 6/2007 | Sun | |
| 2007/0217506 A1 | 9/2007 | Yang et al. | |
| 2008/0002770 A1 | 1/2008 | Ugur et al. | |
| 2008/0152005 A1 | 6/2008 | Oguz et al. | |
| 2008/0232705 A1 | 9/2008 | Sohn et al. | |
| 2008/0240245 A1 | 10/2008 | Lee et al. | |
| 2009/0034632 A1* | 2/2009 | Chono | H04N 19/593 |
| | | | 375/E7.2 |
| 2009/0034857 A1 | 2/2009 | Moriya et al. | |
| 2009/0097571 A1 | 4/2009 | Yamada et al. | |
| 2009/0103613 A1 | 4/2009 | Jeon et al. | |
| 2009/0116546 A1 | 5/2009 | Park et al. | |
| 2009/0180539 A1 | 7/2009 | Kundana et al. | |
| 2009/0196350 A1 | 8/2009 | Xiong | |
| 2009/0268974 A1 | 10/2009 | Takagi | |
| 2010/0054334 A1 | 3/2010 | Yoo et al. | |
| 2010/0054616 A1 | 3/2010 | Kim | |
| 2010/0195715 A1 | 8/2010 | Liu et al. | |
| 2010/0208802 A1 | 8/2010 | Tsukuba et al. | |
| 2010/0329341 A1 | 12/2010 | Kam et al. | |
| 2011/0090969 A1 | 4/2011 | Sung et al. | |
| 2011/0268188 A1 | 11/2011 | Kim et al. | |
| 2011/0292994 A1 | 12/2011 | Lim et al. | |
| 2012/0224777 A1 | 9/2012 | Kim et al. | |
| 2012/0250766 A1 | 10/2012 | Wu et al. | |
| 2013/0101032 A1 | 4/2013 | Wittmann et al. | |
| 2013/0136184 A1 | 5/2013 | Suzuki et al. | |
| 2014/0219342 A1 | 8/2014 | Yu et al. | |
| 2015/0003523 A1 | 1/2015 | Valin et al. | |
| 2015/0043634 A1 | 2/2015 | Lin et al. | |
| 2020/0021805 A1 | 1/2020 | Ko et al. | |
| 2020/0275124 A1 | 8/2020 | Ko et al. | |
| 2020/0288137 A1 | 9/2020 | Lim et al. | |
| 2020/0344485 A1 | 10/2020 | Lim et al. | |
| 2021/0084306 A1 | 3/2021 | Sasai et al. | |
| 2021/0360240 A1* | 11/2021 | Lee | H04N 19/12 |
| 2023/0097850 A1* | 3/2023 | Liu | H04N 19/105 |
| | | | 375/240.02 |
| 2023/0103405 A1* | 4/2023 | Xu | H04N 19/105 |
| | | | 375/240.02 |

FOREIGN PATENT DOCUMENTS

| | | |
|---|---|---|
| KR | 10-2005-0026318 A | 3/2005 |
| KR | 10-2006-0007786 A | 1/2006 |
| KR | 10-2006-0027814 A | 3/2006 |
| KR | 10-2008-0088040 A | 10/2008 |
| KR | 10-2009-0058954 A | 6/2009 |
| KR | 10-2009-0088863 A | 8/2009 |
| KR | 10-2010-0014552 A | 2/2010 |
| KR | 10-2010-0109459 A | 10/2010 |
| KR | 10-2021-0058779 A | 5/2021 |
| WO | WO 2009/136743 A2 | 11/2009 |
| WO | WO 2011/101448 A2 | 8/2011 |

\* cited by examiner

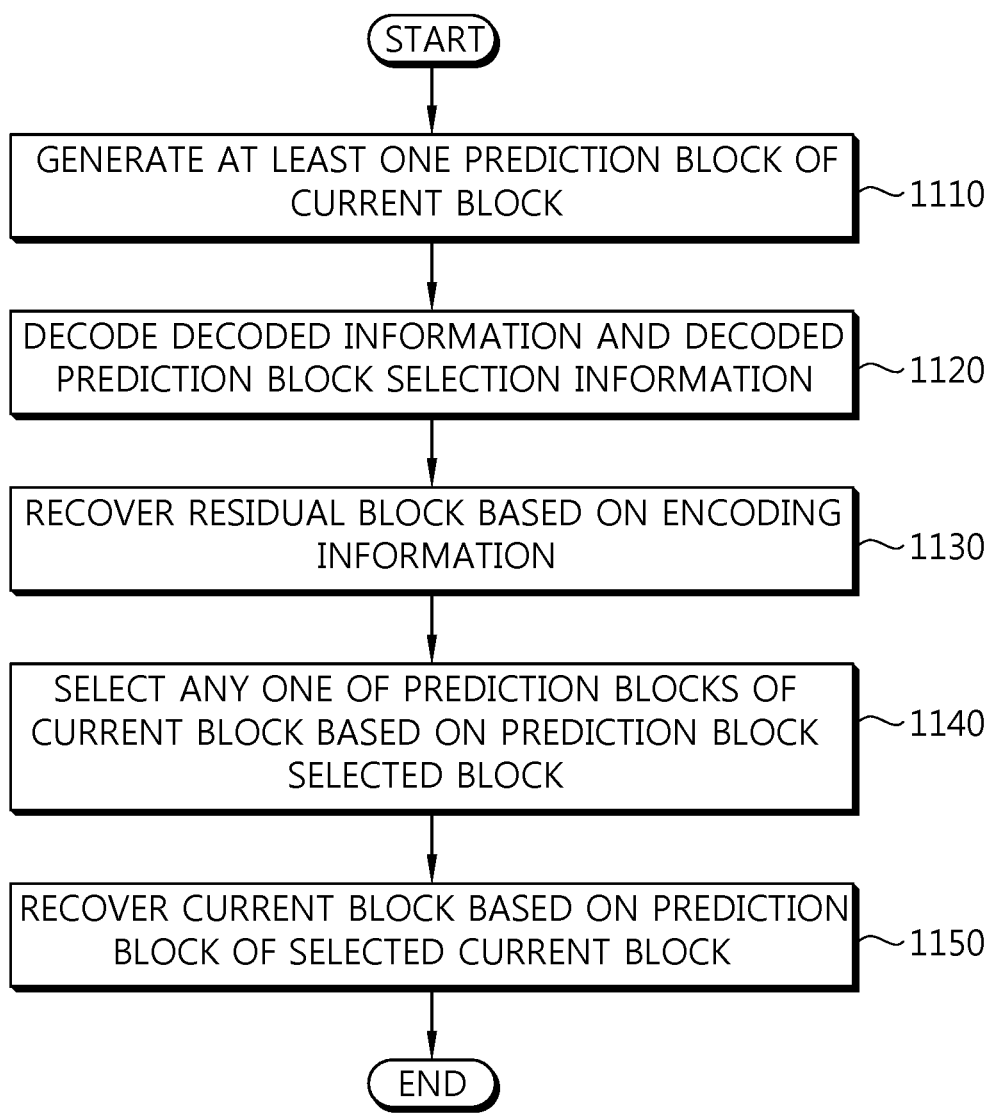

METHOD AND DEVICE FOR SIMPLIFYING THE ENCODING AND DECODING OF ULTRA-HIGH DEFINITION IMAGES

CROSS REFERENCE TO RELATED APPLICATIONS

This application is a Continuation Application of U.S. patent application Ser. No. 16/533,921, filed on Aug. 7, 2019, which is a Continuation Application of U.S. patent application Ser. No. 15/712,835 filed on Sep. 22, 2017, which is a Continuation Application of U.S. patent application Ser. No. 13/990,190 filed on May 29, 2013, now U.S. Pat. No. 9,794,556 issued on Oct. 17, 2017, which is a national stage application of, International Application No. PCT/KR2011/009167, filed on Nov. 29, 2011 which claims the benefit under 35 U.S.C. § 119(a) of Korean Patent Application No. 10-2010-0124368, filed on Dec. 7, 2010, in the Korean Intellectual Property Office, the entire disclosures of which are incorporated herein by reference for all purposes.

BACKGROUND

Technical Field

The present invention relates to a technology capable of lowering calculation complexity and improving encoding efficiency at the time of performing intra prediction encoding on an ultrahigh definition resolution image.

Background Art

A broadcast service having high definition (HD) resolution such as 1280×1024, 1920×1080, etc., has been expanded in the country and around the world. Therefore, users require contents having higher resolution and better quality of image such as 4K (3840×2160), 8K (7680×4320), or the like, so as to watch a more realistic image.

The number of pixels of a 4K image is four times larger than that of an HD image, and the number of pixels of an 8K (7680×4320) is sixteen times larger than that of the HD image. Therefore, the 4K and 8K images can be displayed delicately and naturally, as compared with the image having the HD resolution. Generally, in order to encode the 4K or 8K image, H.264/AVC (MPEG-4 Part 10 Advanced Video Coding) has been used. As such, as the resolution of an image is increased, inter-pixel spatial correlation may be largely increased.

FIG. 1 is a diagram showing comparison results of the number of pixel used to display a portion of the image, on the basis of each resolution.

In FIG. 1, when the number of pixels used to display a portion of an image is four in 480×270 resolution above QVGA (352×288) resolution, the number of pixels used to display a portion of an image is nine and twenty five, respectively, in FULL HDTV (1920×1980). Further, a portion of an image is displayed by 100 pixels in the 4K (3840×2160) resolution, and a portion of an image is displayed by 361 pixels in the 8K (7680×4320) resolution. As such, in the image of the 4K and 8K resolution, the number of pixels used to display a portion of a specific image is excessively large. In other words, the image of the 4K and 8K resolution has inter-pixel correlation much higher than that of the image of the HD resolution or less. In particular, the inter-pixel correlation is higher in an image having flat characteristics rather than having complicated characteristics or a portion of the image.

As such, when performing the intra prediction in an ultrahigh definition resolution image having the very high inter-pixel correlation such as 4K, 8K, or the like, pixel values of current blocks may be almost predicted by using only pixel values of peripheral blocks. Therefore, when the inter-pixel correlation is high, a process of encoding and decoding residual blocks is a factor of the increase in calculation complexity and the reduction in encoding efficiency.

Therefore, when encoding and decoding the ultrahigh definition resolution image having the inter-pixel correlation, a need exists for an encoding and decoding technology capable of improving the encoding efficiency while reducing the calculation complexity.

SUMMARY

Technical Problem

The present invention provides an encoding apparatus and method and a decoding apparatus and method capable of reducing calculation complexity according to intra prediction encoding for an ultrahigh definition resolution image having high inter-pixel correlation.

The present invention also provides an encoding apparatus and method and a decoding apparatus and method capable of improving decoding efficiency by performing encoding and decoding using prediction blocks having the best encoding efficiency among a plurality of prediction blocks.

Technical Solution

In an aspect, there is provided an encoding apparatus including: an intra prediction unit that generates prediction blocks of current blocks based on a reference image; a subtraction unit that generates residual blocks through a difference between the current blocks and the prediction blocks; an encoding information generation unit that generates encoding information representing whether residual blocks are encoded based on whether the residual blocks are encoded; and an entropy decoding unit that performs entropy encoding on at least one of the residual blocks and the encoding information based on the encoding information.

The entropy encoding may generate bitstreams by encoding only the encoding information when the encoding information includes information representing that the residual blocks are not encoded.

The intra prediction unit may generate the prediction blocks by using any one of methods for generating a plurality of prediction blocks.

The intra prediction unit may generate a plurality of prediction blocks of the current blocks according to the methods for generating a plurality of prediction blocks.

The intra prediction unit may generate the prediction blocks of the current blocks in plural, based on the methods for generating prediction blocks used at the time of generating the prediction blocks of each of the recovered peripheral blocks.

The encoding apparatus may include a prediction block selection unit that selects any one of the generated prediction blocks of the plurality of current blocks.

In another aspect, there is provided an encoding method, including: generating prediction blocks of current blocks based on a reference image; generating residual blocks through a difference between the current blocks and the prediction blocks; generating encoding information representing whether residual blocks are encoded based on whether the residual blocks are encoded; transforming and quantizing the residual blocks based on the encoding information; and performing entropy encoding on at least one of the residual blocks and the encoding information based on the encoding information.

The entropy encoding may generate bitstreams by encoding only the encoding information when the encoding information includes the information representing that the residual blocks are not encoded.

The generating of the prediction blocks may generate the prediction blocks of the current blocks in plural according to methods for generating a plurality of prediction blocks.

The generating of the prediction blocks may generate at least one of the prediction blocks of the current blocks based on the methods for generating prediction blocks used at the time of generating the prediction blocks of each of decoded peripheral blocks.

The encoding method may further include selecting any one of the prediction blocks having the best encoding efficiency among the generated prediction blocks of the current blocks.

In still another aspect, there is provided a decoding apparatus, including: an entropy decoding unit that decodes encoding information extracted from bitstreams; an intra prediction unit that generates prediction blocks of current blocks by using decoded peripheral blocks; an adding unit that recovers the current blocks by using at least one of decoded residual blocks and the prediction blocks of the current blocks based on the decoded encoding information.

The adding unit may recover the current blocks by using only the prediction blocks of the current blocks when the encoding information includes information representing that the residual blocks are not encoded.

In still another aspect, there is provided a decoding method, including: extracting at least one of encoding information encoded from bitstreams and prediction block selection information; decoding the encoded information and the prediction block selection information; generating the prediction blocks of the current blocks by using the decoded peripheral blocks; selecting any one of the prediction blocks of the current blocks based on the decoded prediction block selection information; and recovering the current blocks by using at least one of the decoded residual blocks and the prediction blocks of the selected current blocks based on the decoded encoding information.

Advantageous Effects

As set forth above, the exemplary embodiments of the present invention can reduce the calculation complexity according to the output of the bitstreams by using the prediction blocks of the current blocks at the time of performing the intra prediction encoding on the ultrahigh definition resolution image having the high inter-pixel correlation.

Further, the exemplary embodiments of the present invention can improve the encoding efficiency by performing the encoding and decoding using the prediction blocks having the best encoding efficiency among the plurality of prediction blocks.

DESCRIPTION OF DRAWINGS

FIG. 11 is a flow chart for describing an operation of the decoding apparatus according to the embodiment of the present invention.

DETAILED DESCRIPTION

Figure 1:
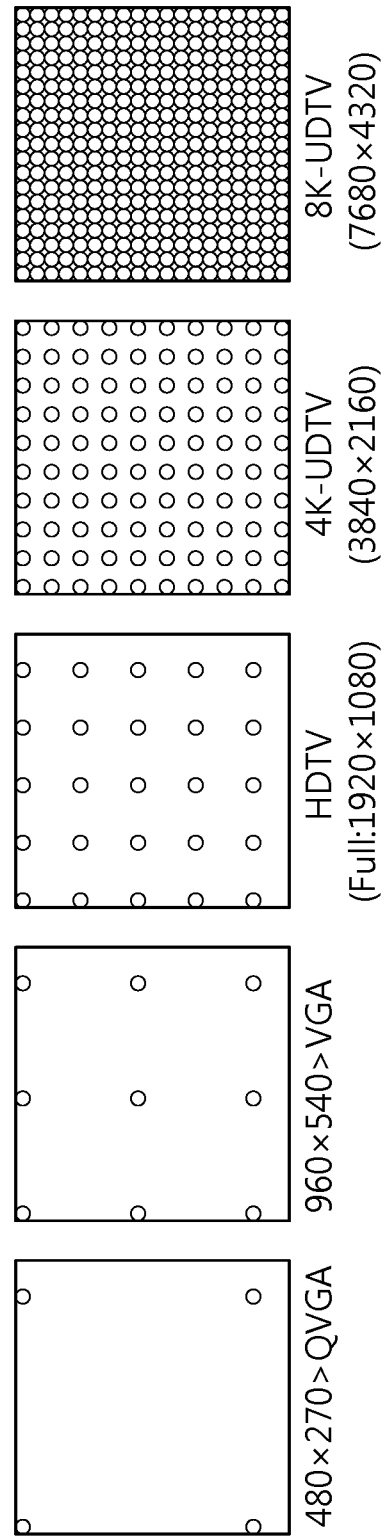
FIG. 1 is a diagram showing comparison results of the number of pixels used to display a portion of an image, on the basis of each resolution.

Hereinafter, exemplary embodiments of the present invention will be described in detail with reference to the accompanying drawings. However, the present invention is not limited to exemplary embodiments described below. In addition, like reference numerals provided in each drawing denotes like components.

Figure 2:
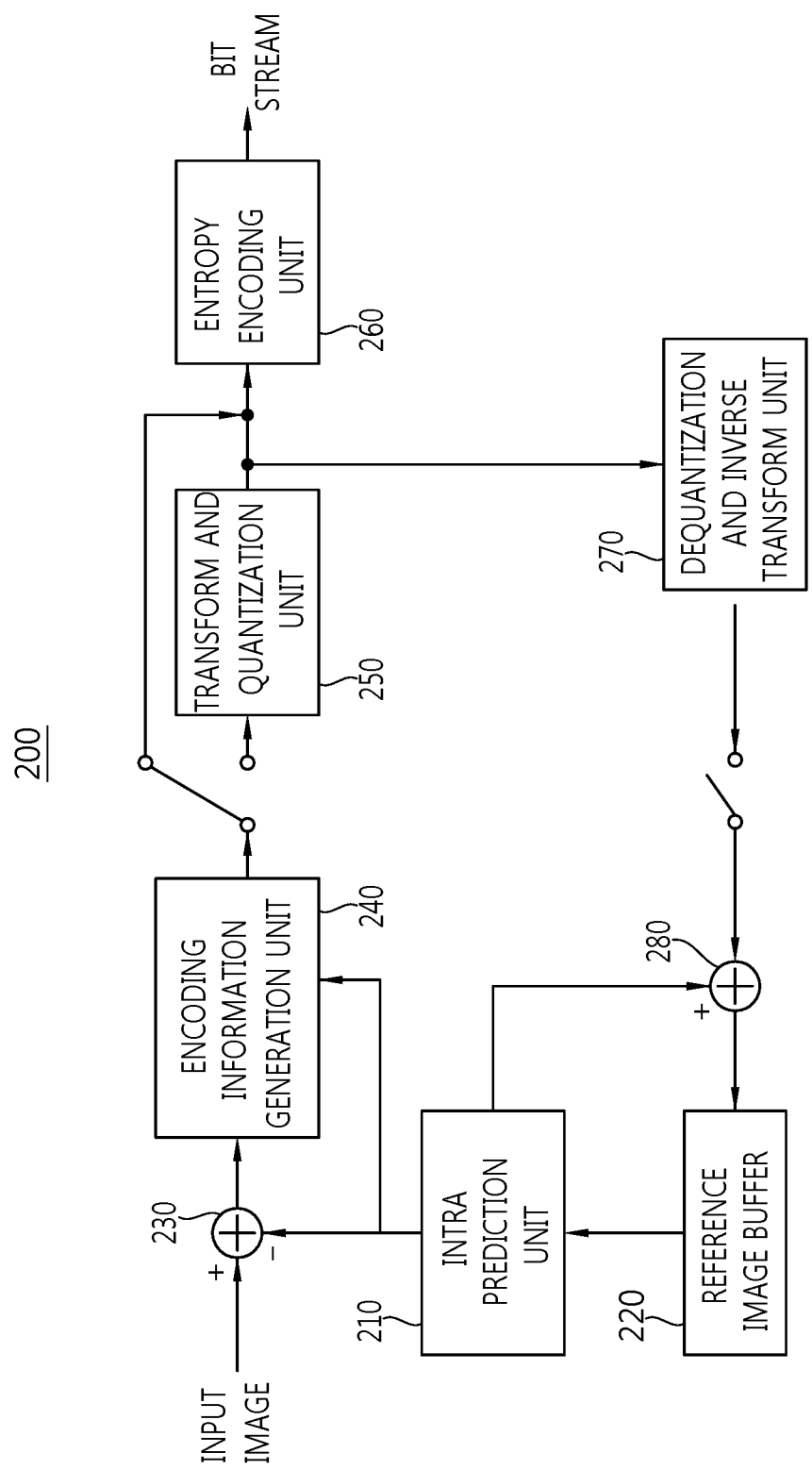
FIG. 2 is a diagram showing a configuration of an encoding apparatus according to the embodiment of the present invention.

FIG. 2 is a diagram showing a configuration of an encoding apparatus according to the embodiment of the present invention.

In FIG. 2, an input image having a size of 16×16 pixels in a width and a length may be processed in an encoding unit. In this case, the encoding apparatus may output bitstreams generated through intra prediction encoding or inter prediction encoding. First, a process of the intra prediction encoding process will be described with reference to FIG. 2 and a process of inter prediction encoding will be described with reference to FIG. 3.

Referring to FIG. 2, an encoding apparatus 200 may include an intra prediction unit 210, a reference image buffer 220, a subtraction unit 230, an encoding information generation 240, a conversion and quantization unit 250, an entropy encoding unit 260, a dequantization and inverse transform unit 270, and an adding unit 280.

The intra prediction unit 210 may generate the prediction blocks of the current blocks based on a reference image stored in the reference image buffer 220. In this case, when using peripheral blocks recovered to the reference image, the intra prediction unit 210 may generate the prediction blocks of the current blocks by using any one of a plurality of methods for generating a plurality of predetermined prediction blocks and pixel values of peripheral blocks that are spatially adjacent to the current blocks.

For example, (1) the intra prediction unit 210 copies (pads) the pixels of the peripheral blocks adjacent to the current blocks to generate the prediction blocks of the current blocks. In this case, the pixels copied (padded) to the current blocks may be changed according to the predicted direction, and the predicted direction information may be encoded so as to be included in the bitstreams. In other words, the intra prediction unit 210 may generate the prediction blocks of the current blocks by using the intra prediction method of H.264/AVC.

As another example, (2) the intra prediction unit 210 may determine the prediction direction based on similarity between the current blocks and the peripheral blocks and copy the pixels of the peripheral blocks according to the determined prediction direction to generate the prediction blocks of the current blocks. In other words, the intra prediction unit 210 may select the peripheral blocks positioned in the determined prediction direction among the plurality of peripheral blocks adjacent to the current blocks and copy the pixels of the selected peripheral blocks, thereby generating the prediction blocks of the current blocks.

As another exemplary embodiment, (3) the intra prediction unit 210 may extract the blocks most similar to the current blocks by matching in a current screen region in which the encoding is performed in advance. Further, the intra prediction unit 210 may generate the prediction blocks of the current blocks by using the extracted blocks. In this case, difference information on a position between the current blocks and the prediction blocks of the current blocks may be included in the bitstreams.

As another exemplary embodiment, (4) the intra prediction unit 210 may search a type most similar to the peripheral blocks in the current screen region in which the encoding is performed in advance and may generate the blocks enclosed by the searched type as the prediction blocks of the current blocks.

As another exemplary embodiment, (5) the intra prediction unit 210 mixes methods for generating a plurality of predetermined prediction blocks to generate the prediction blocks of the current blocks. In this case, the intra prediction unit 210 may generate the prediction blocks by using an average value of the prediction blocks generated by the above methods for generating the plurality of prediction blocks. In addition, the prediction blocks may be generated by a sum of weight values according to each of the methods for generating the plurality of prediction blocks.

The subtracting unit 230 may generate residual blocks by subtracting the current blocks and the prediction blocks of the current blocks.

The encoding information generation unit 240 may generate the encoding information based on whether the residual blocks are encoded. As an example, in order to determine whether the residual blocks are encoded or not, the similarity between the current blocks and the prediction blocks of the current blocks, or the like, may be used.

When the similarity between the current blocks and the prediction blocks of the current blocks is used, the encoding information generation unit 240 may calculate the similarity between the current blocks and the prediction blocks of the current blocks by using sum of absolute difference (SAD), sum of absolute transformed differences (SATD), sum of squared difference (SSD), or the like. Further, the encoding information generation unit 240 may generate the encoding information based on the calculated similarity.

Herein, the encoding information may include information representing whether the residual blocks are encoded or not.

For example, when the similarity between the current blocks and the prediction blocks of the current blocks is the reference similarity or more, the encoding information generation unit 240 may generate the encoding information including the information representing that the residual blocks are not encoded.

As another example, when the similarity between the current blocks and the prediction blocks is less than the reference similarity, the encoding information generation unit 240 may generate the encoding information including the information representing that the residual blocks are encoded.

Then, the transform and quantization unit 250 may transform and quantize the residual blocks based on the encoding information. Further, the entropy encoding unit 260 may perform the entropy encoding on at least one of the encoding information and the residual blocks based on the encoding information to generate the bitstreams.

For example, when the encoding information includes the information representing that the residual blocks are not encoded, the transform and the quantization unit 250 cannot transform and quantize the residual blocks. Then, the entropy encoding unit 260 may perform the entropy encoding on only the encoding information without the residual blocks to generate the bitstreams. Therefore, the calculation complexity and the encoding time may be reduced by not transforming and quantizing the residual blocks. As such, when the encoding information includes the information representing that the residual blocks are not encoded, the generated bitstreams may include the encoded information.

As another example, when the encoding information includes the information representing that the residual blocks are encoded, the transform and the quantization unit 250 can transform and quantize the residual block. Then, the entropy decoding unit 260 may perform the entropy encoding on the transformed and quantized residual blocks and perform the entropy encoding on the encoding information. Further, the entropy encoding unit 260 may generate the bitstreams by mixing the encoded residual blocks and the encoded encoding information. As such, when the encoding information includes the information representing that the residual blocks are encoded, the generated bitstreams may include the encoded residual blocks and the encoded encoding information.

In this case, the transform and quantization unit 250 may differently perform the transform and quantization on the residual blocks according to the intra prediction encoding mode.

For example, when using 16×16 intra prediction encoding, the transform and quantization unit 250 may transform the residual blocks to generate a transform coefficient and collect a DC coefficient among the generated transform coefficients to perform Hadamard transform. Then, the entropy encoding unit 260 may perform the entropy encoding on only the Hadamard transformed DC coefficient to output the bitstreams.

As another example, when using the 8×8 and 4×4 intra prediction encoding mode other than 16×16, the transform and quantization unit 250 transforms the residual blocks to generate the transform coefficient and quantizes the generated transform coefficient according to quantization parameters to generate the quantized coefficient. Then, the entropy encoding unit 260 may perform the entropy encoding on the generated quantized coefficient according to a probability distribution to be output as the bitstreams.

The dequantization and inverse transform unit 270 may perform the dequantization and inverse transform on the quantized coefficient output from the transform and quantization unit 250 to decode the residual blocks.

Further, the adding unit 280 adds the decoded residual blocks to the prediction blocks of the current blocks to recover the current blocks. Then, the reference image buffer 220 may store the recovered current blocks.

As such, the peripheral blocks recovered at the previous stage may be stored as the reference block in the reference image buffer 220 since the recovered current blocks are stored in the reference image buffer 220.

Then, when the encoding information includes the information representing that the residual blocks are not encoded, the recovered peripheral blocks stored in the reference image buffer 220 are blocks recovered by using only the prediction blocks of the peripheral blocks. Then, when the encoding information includes the information representing that the residual blocks are encoded, the recovered peripheral blocks stored in the reference image buffer 220 are blocks recovered by using the residual blocks and the prediction blocks of the peripheral blocks. Therefore, the intra prediction unit 210 may generate the prediction blocks of the current blocks by using the peripheral blocks recovered by using only the prediction blocks of the peripheral blocks according to the encoding information or the peripheral blocks recovered by using the recovered residual blocks and the prediction blocks of the peripheral blocks.

Although FIG. 2 describes the configuration of performing the intra prediction encoding on the input image for convenience of explanation, a configuration of performing the intra prediction encoding and the inter prediction encoding will be described with reference to FIG. 3.

Figure 3:
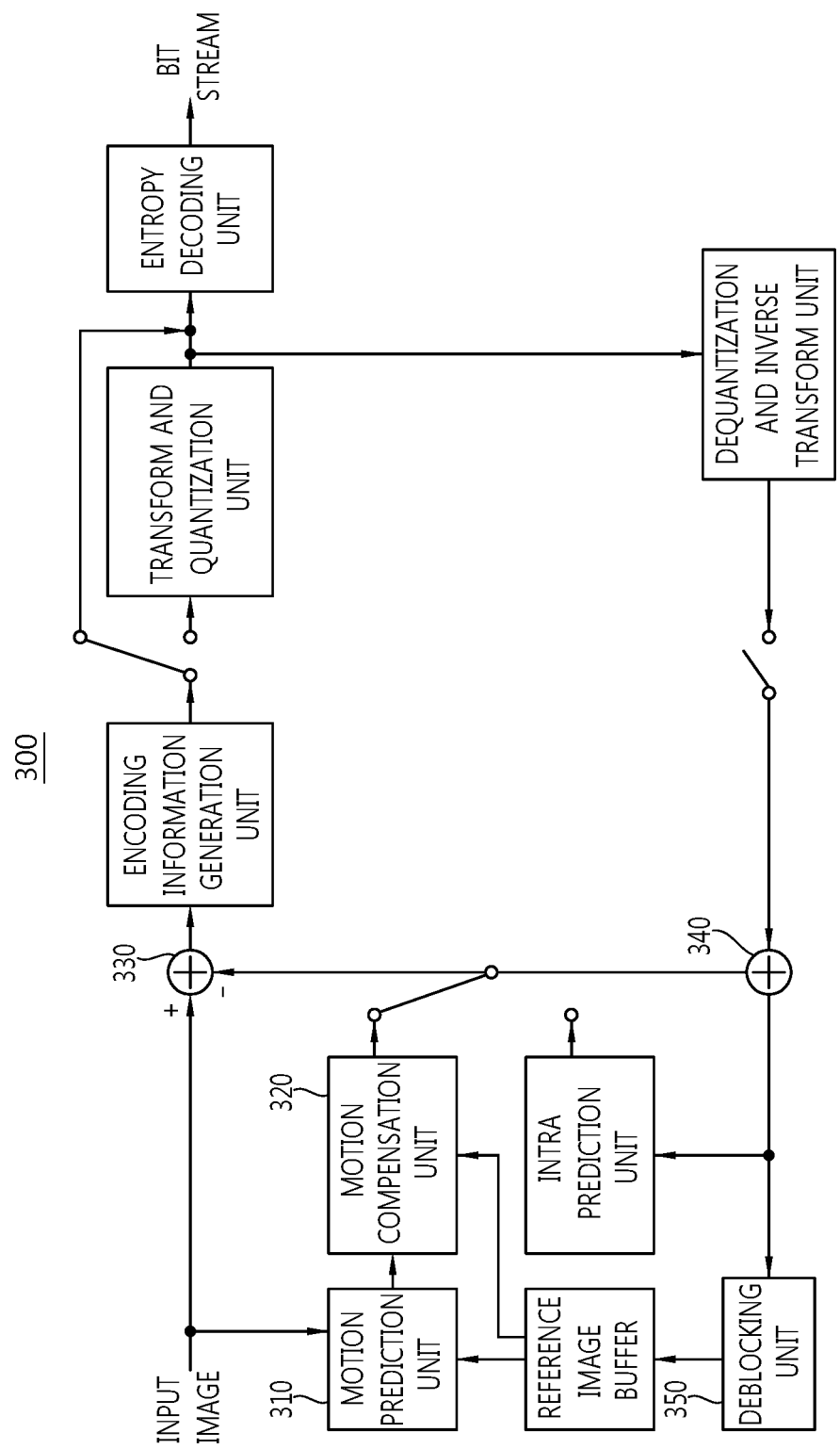
FIG. 3 is a diagram showing an overall configuration of an encoding apparatus according to the embodiment of the present invention.

FIG. 3 is a diagram showing the overall configuration of the encoding apparatus according to the embodiment of the present invention.

Components of FIG. 3 are substantially the same as the components mentioned with reference to the operation of FIG. 2 and therefore, the repeated description thereof will be omitted. An encoding apparatus 300 of FIG. 3 may further include a motion prediction unit 310, a motion compensation unit 320, and a deblocking unit 350 in the encoding apparatus 200 of FIG. 2.

The motion prediction unit 310 may search a region optimally matched with the current blocks among the reference images by using various motion estimation algorithms such as a block matching algorithm (BMA), phase correlation, HSBMA, or the like, to thereby calculate a motion vector.

Then, the motion compensation unit 320 may use the calculated motion vector to perform the motion compensation, thereby generating the prediction blocks of the current blocks. As such, the encoding apparatus according to the embodiment of the present invention may perform the inter prediction encoding through the motion prediction and compensation. Then, the subtracting unit 330 may generate the residual blocks by subtracting the prediction blocks of the current blocks and the current blocks that are generated through the inter prediction encoding or the intra prediction encoding.

The adding unit 340 may recover the current blocks by using at least one of the prediction blocks of the current blocks and the recovered residual blocks. Further, the recovered current blocks may be stored in the reference image buffer.

For example, when the residual blocks are not transformed and quantized in the transform and quantization unit, the adding unit 340 may recover the current blocks only by using the prediction blocks of the current blocks. As another example, when the residual blocks are transformed and quantized in the transform and quantization unit, the adding unit 340 may recover the current blocks by adding the prediction blocks of the current blocks and the residual blocks.

Then, the deblocking unit 350 may remove a blocking artifact in the current blocks recovered using the deblocking filter to be stored in the reference image buffer.

In FIG. 3 the inter prediction encoding is divided into the 16×16, 16×8, 8×16, and 8×8 inter prediction encoding modes and the 8×8 inter prediction mode may back be divided into the 8×8, 8×4, 4×8, and 4×4 sub inter prediction encoding mode.

Figure 4:
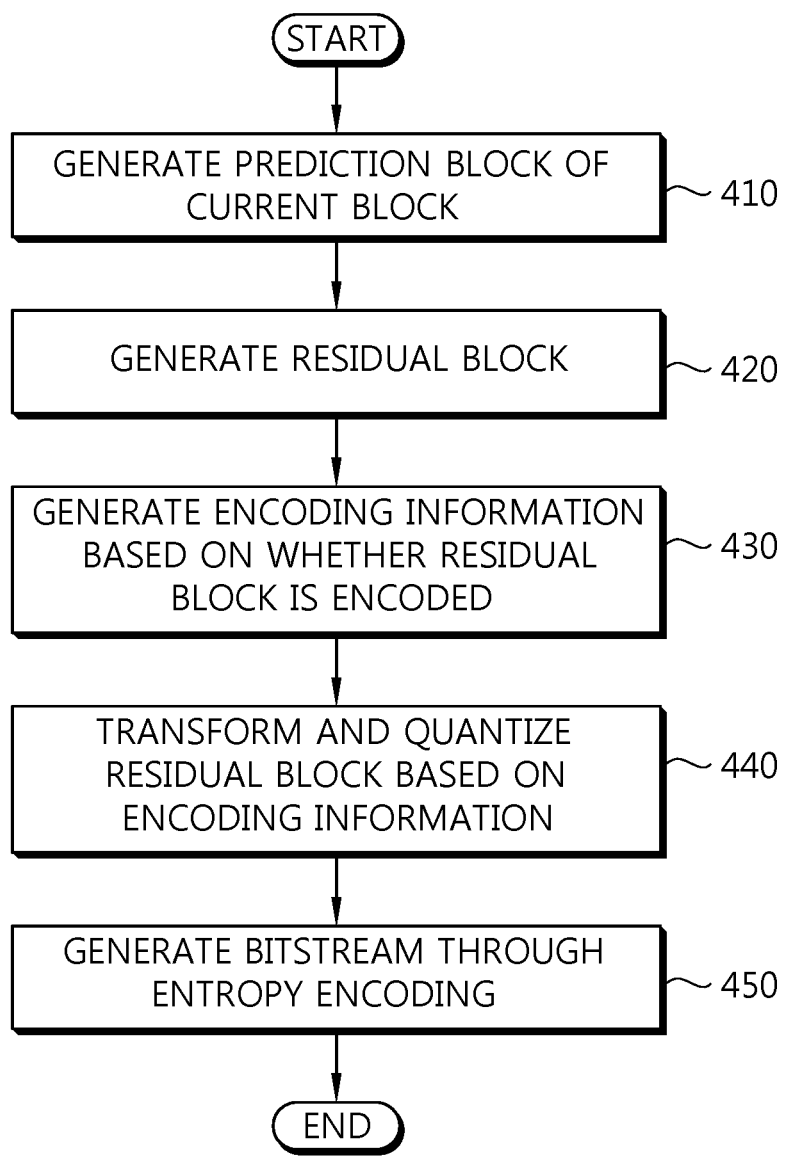
FIG. 4 is a flow chart for describing an operation of the encoding apparatus according to the embodiment of the present invention.

FIG. 4 is a flow chart for describing an operation of the encoding apparatus according to the embodiment of the present invention.

First, at S410, the intra prediction unit 210 may generate the prediction blocks of the current blocks based on the reference image.

For example, the intra prediction unit 210 may generate the prediction blocks of the current blocks by using any one of the predefined methods for generating the plurality of prediction blocks. Here, the recovered peripheral blocks may use the reference image. In this case, the recovered peripheral blocks may be blocks that are recovered using only the prediction blocks of the peripheral blocks or recovered using the prediction blocks of the peripheral blocks and the decoded residual block. Further, the intra prediction unit 210 may generate the prediction blocks of the current blocks by using the recovered peripheral blocks.

Then, at S420, the subtracting unit 230 may subtract the current blocks and the prediction blocks of the current blocks to generate the residual block.

Further, at S430, the encoding information generation unit 240 may generate the encoding information based on whether the residual blocks are encoded. In this case, whether the residual blocks are encoded may be determined based on the similarity between the current blocks and the prediction blocks of the current blocks, or the like.

For example, when the similarity is used, the encoding information generation unit 240 may calculate the similarity between the current blocks and the prediction blocks of the current blocks by using the sum of absolute difference (SAD), the sum of absolute transformed differences (SATD), the sum of squared difference (SSD), or the like. Further, the encoding information generation unit 240 may generate the encoding information based on the calculated similarity.

In this case, when the calculated similarity is above a reference similarity, the encoding information generation unit 240 may generate the encoding information so as to include the information representing that the residual blocks are not encoded. Further, when the calculated similarity is below the reference similarity, the encoding information generation unit 240 may generate the encoding information so as to include the information representing that the residual blocks are encoded.

Then, at S440, the transform and quantization unit 250 may transform and quantize the residual blocks based on the encoding information.

In this case, when the encoding information includes the information representing that the residual blocks are encoded, the transform and the quantization unit 250 can transform and quantize the residual blocks.

Further, when the encoding information includes the information representing that the residual blocks are not encoded, the transform and the quantization unit 250 cannot transform and quantize the residual blocks.

Then, at S450, the entropy encoding unit 260 may perform the entropy encoding on at least one of the transformed and quantized residual blocks and encoding information to be output as the bitstreams.

For example, when the residual blocks are transformed and quantized based on the encoding information, the entropy encoding unit 260 may perform the entropy encoding on the transformed and quantized residual blocks and perform the entropy encoding on the encoding information. Further, the entropy encoding unit 260 may transmit the bitstreams generated by mixing the encoded residual blocks and the encoded information to a decoding apparatus.

As another example, when the residual blocks are not transformed and quantized based on the encoding information, the entropy encoding unit 260 may perform the entropy encoding on only the encoding information without the residual blocks to be output as the bitstreams.

Figure 5:
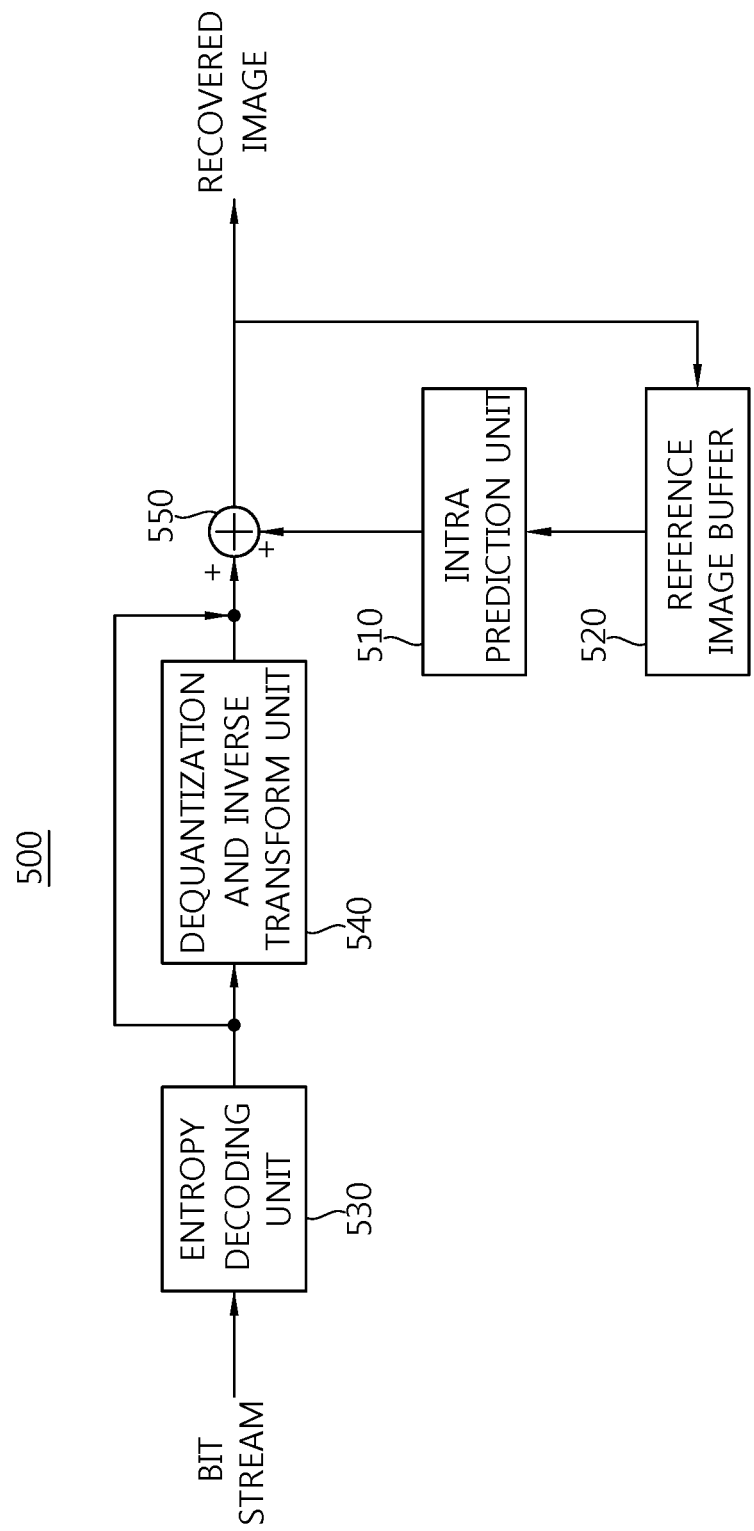
FIG. 5 is a block diagram showing a configuration of a decoding apparatus according to the embodiment of the present invention.

FIG. 5 is a block diagram showing a configuration of a decoding apparatus according to the embodiment of the present invention.

Referring to FIG. 5, a decoding apparatus 500 may include an intra prediction unit 510, a reference image buffer 520, an entropy decoding unit 530, a dequantization and inverse transform unit 540, and an adding unit 550.

The intra prediction unit 510 may generate the prediction blocks of the current blocks based on the reference image. In this case, the intra prediction unit 520 may generate the prediction blocks of the current blocks by using any one of the predefined methods for generating the plurality of prediction blocks. Here, the predefined methods for generating a plurality of prediction blocks are described in advance in the intra prediction unit 210 of FIG. 2, and the repeated description thereof will be omitted.

The intra prediction unit 510 may generate the prediction blocks of the current blocks based on a reference image stored in the reference image buffer 520. In this case, the recovered peripheral blocks may be blocks that are recovered using only the prediction blocks of the peripheral blocks or recovered using the prediction blocks of the prediction blocks and the decoded residual block.

The entropy decoding unit 530 may demultiplex the bitstreams to extract the encoded information and perform the entropy decoding on the encoded information.

In this case, when the encoding information includes the information representing that the residual blocks are encoded, the entropy decoding unit 530 may extract the encoded information and the encoded residual blocks while demultiplexing the bitstreams. Further, the entropy encoding unit 530 may decode the encoded information and decode the encoded residual block.

Further, when the encoding information includes the information representing that the residual blocks are not encoded, the entropy decoding unit 530 may extract the encoded information while demultiplexing the bitstreams. That is, when the encoding information includes the information representing that the residual blocks are not encoded, encoded residual blocks may not be included in the bitstreams. Therefore, the entropy decoding unit 530 may perform the entropy decoding on only the encoded encoding information.

The dequantization and inverse transform unit 540 may perform the dequantization and the inverse transform based on the decoded encoding information to decode the residual blocks.

For example, when the encoding information does not include the information representing that the residual blocks are not encoded, the dequantization and inverse transform unit 540 may perform the dequantization on the encoded residual blocks by using variable length decoding based on the probability distribution to output the quantized coefficient.

In this case, the output quantized coefficient may include only the DC coefficient information and may include both of the DC coefficient information the AC coefficient information.

As another example, when the encoding information includes the information representing that the residual blocks are not encoded, the dequantization and inverse transform unit 540 cannot be operated since there are no encoded residual blocks extracted from the bitstreams. In other words, the dequantization and inverse transform unit 540 may be operated only when the encoded residual blocks are included in the bitstreams.

The adding unit 550 may recover the current blocks by using at least one of the residual blocks decoded based on the encoding information and the prediction blocks of the current blocks.

For example, when the encoding information includes the information representing that the residual blocks are encoded, the adding unit 550 may recover the current blocks by adding the recovered residual blocks and the prediction blocks of the current blocks.

As another example, when the encoding information includes the information representing that the residual blocks are not encoded, the adding unit 550 may recover the current blocks by using only the prediction blocks of the current blocks generated in the intra prediction unit 510.

The reference image buffer 520 may store the recovered current blocks.

Figure 6:
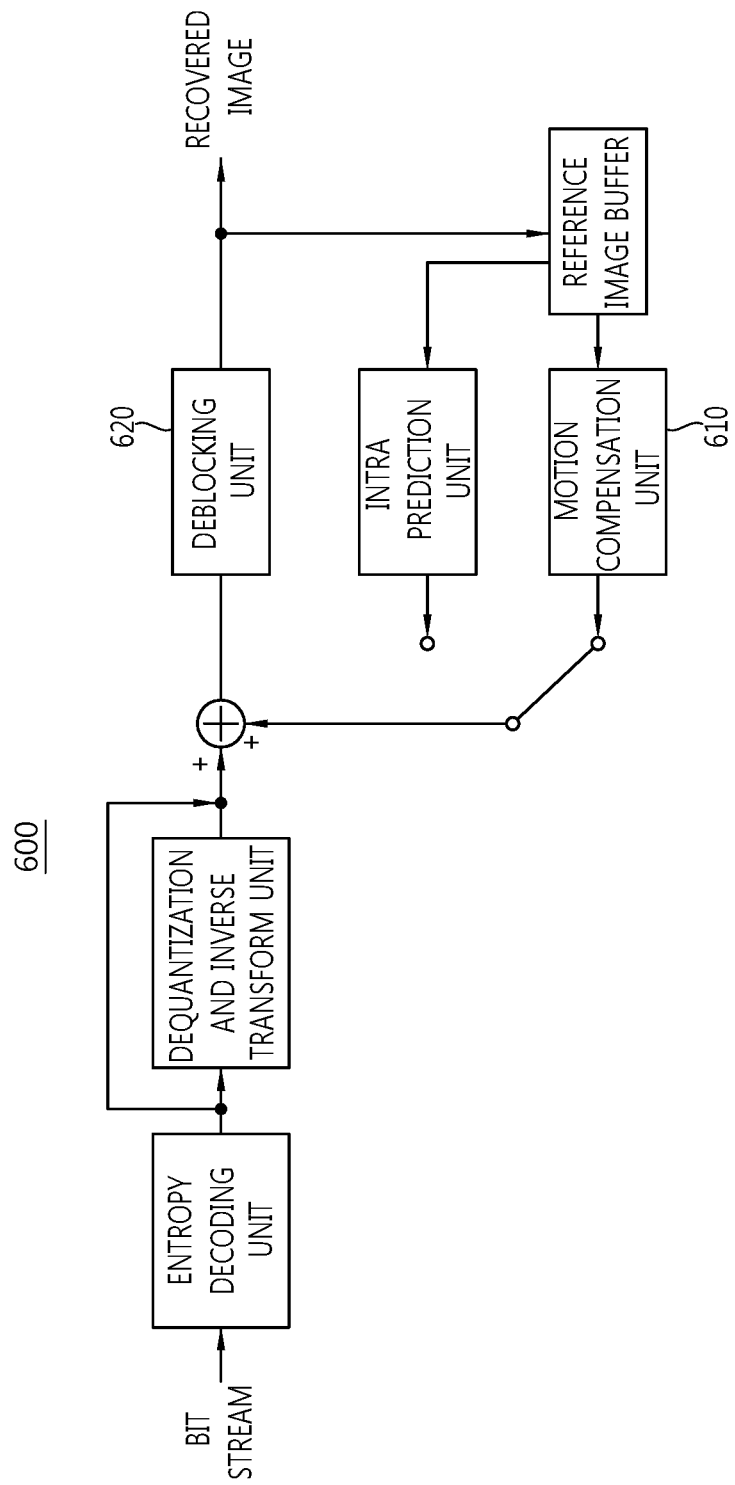
FIG. 6 is a diagram showing the overall configuration of the encoding apparatus according to the embodiment of the present invention.

FIG. 6 is a diagram showing the overall configuration of the decoding apparatus according to the embodiment of the present invention.

Components of FIG. 6 are substantially the same as the components mentioned with reference to the operation of FIG. 5 and therefore, the repeated description thereof will be omitted. A decoding apparatus 600 of FIG. 6 may further include a motion compensation unit 610 and a deblocking unit 620 in the decoding apparatus 500 of FIG. 5.

The motion compensation unit 610 may perform the motion compensation on the reference image by using a motion vector extracted from the bitstreams through the entropy decoding. Further, the motion compensation unit 610 may generate the prediction blocks of the current blocks through the motion compensation.

The deblocking unit 620 may remove the blocking artifact from the recovered current blocks to output the recovered image. Further, the recovered image may be stored in the reference image buffer.

Figure 7:
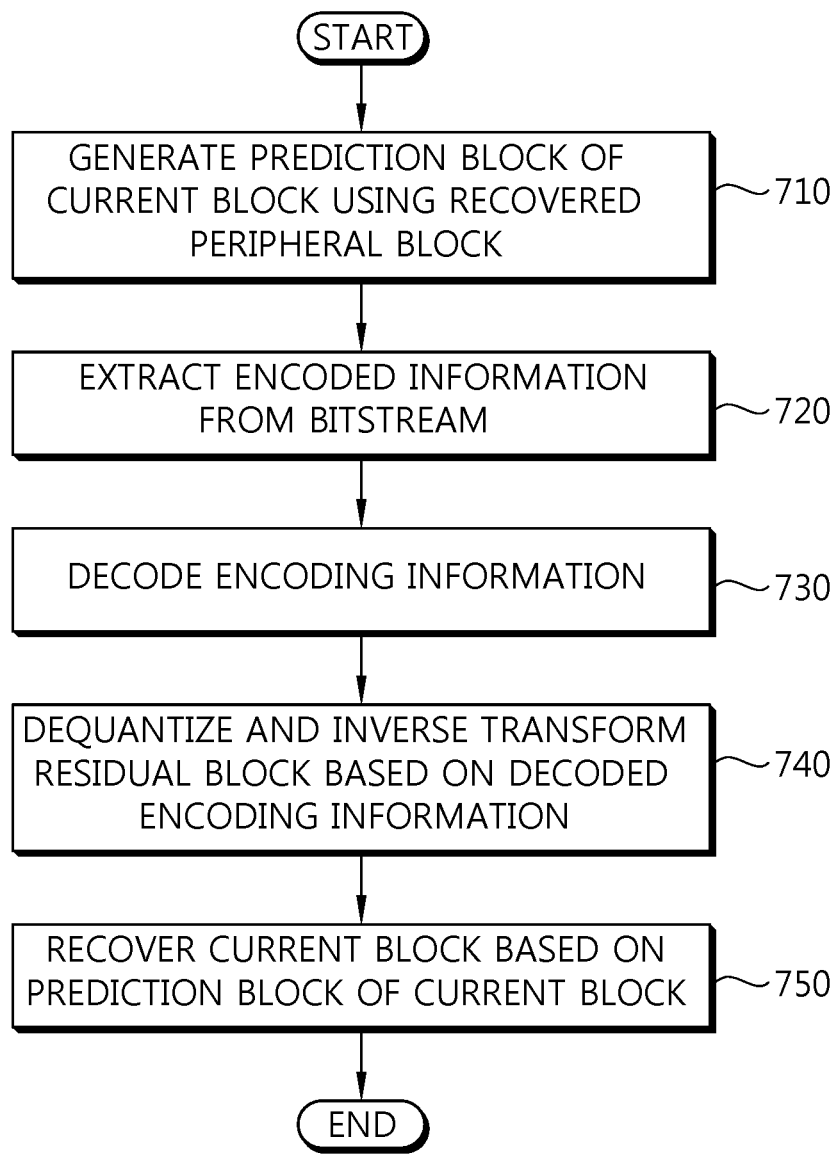
FIG. 7 is a flow chart for describing an operation of the decoding apparatus according to the embodiment of the present invention.

FIG. 7 is a flow chart for describing an operation of the decoding apparatus according to the embodiment of the present invention.

First, at S710, the intra prediction unit 510 may generate the prediction blocks of the current blocks based on the reference image.

The intra prediction unit 510 may generate the prediction blocks of the current blocks based on a reference image stored in the reference image buffer 520. In this case, the intra prediction unit 510 may generate the prediction blocks of the current blocks according to any one of the predefined methods for generating a plurality of prediction blocks, as already described in the intra prediction unit 210 of FIG. 2.

Then, at S720, the entropy decoding unit 530 may demultiplex the bitstreams to extract the encoded information.

Further, at S730, the entropy decoding unit 530 may perform the entropy decoding on the encoded information. Here, the encoding information may include the information representing that the residual blocks are encoded or the information representing that the residual blocks are not encoded.

In this case, when the encoding information includes the information representing that the residual blocks are encoded, the entropy decoding unit 530 may extract the encoded residual blocks from the bitstreams to perform the entropy decoding.

Then, at S740, the dequantization and inverse transform unit 540 may perform the dequantization and inverse transform on the residual blocks based on the decoded encoding information.

For example, the encoding information includes the information representing that the residual blocks are encoded, the dequantization and inverse transform unit 540 performs the dequantization on the encoded residual blocks and then performs the inverse transform thereon, thereby recovering the residual blocks.

As another example, when the encoding information includes the information representing that the residual blocks are not encoded, the operation of the dequantization and inverse transform unit 540 may be omitted since there are no residual blocks extracted from the bitstreams. In other words, the dequantization and inverse transform unit 540 may be operated only when the encoded residual blocks are included in the bitstreams. Therefore, the calculation complexity of the decoding apparatus may be reduced and the decoding time may be shortened.

At S750, the adding unit 750 may recover the current blocks based on at least one of the prediction blocks of the current blocks and the recovered residual blocks.

For example, when the encoding information includes the information representing that the residual blocks are encoded, the adding unit 550 may recover the current blocks by adding the prediction blocks of the current blocks and the recovered residual blocks. Then, the current blocks that are the recovered image may be displayed.

As another example, when the encoding information includes the information representing that the residual blocks are not encoded, the adding unit 550 may recover the current blocks only by using the prediction blocks of the current blocks. In other words, the recovered image may consist of only the prediction blocks of the current blocks.

Up to now, the configuration of generating the prediction blocks of the current blocks using any one of the predefined methods of generating a plurality of prediction blocks has been described with reference to FIGS. 2 to 7. In particular, the encoding and decoding apparatus according to the embodiment of the present invention describes the configuration of recovering the current blocks by using only the prediction blocks of the current blocks based on whether the residual blocks are encoded.

Hereinafter, the configuration of generating the prediction blocks of the current blocks according to the method for generating the prediction blocks used at the time of generating the prediction blocks of the peripheral blocks or the predetermined methods for generating a plurality of prediction blocks and performing the encoding and decoding by selecting any one among the prediction blocks of the current blocks will be described.

Figure 8:
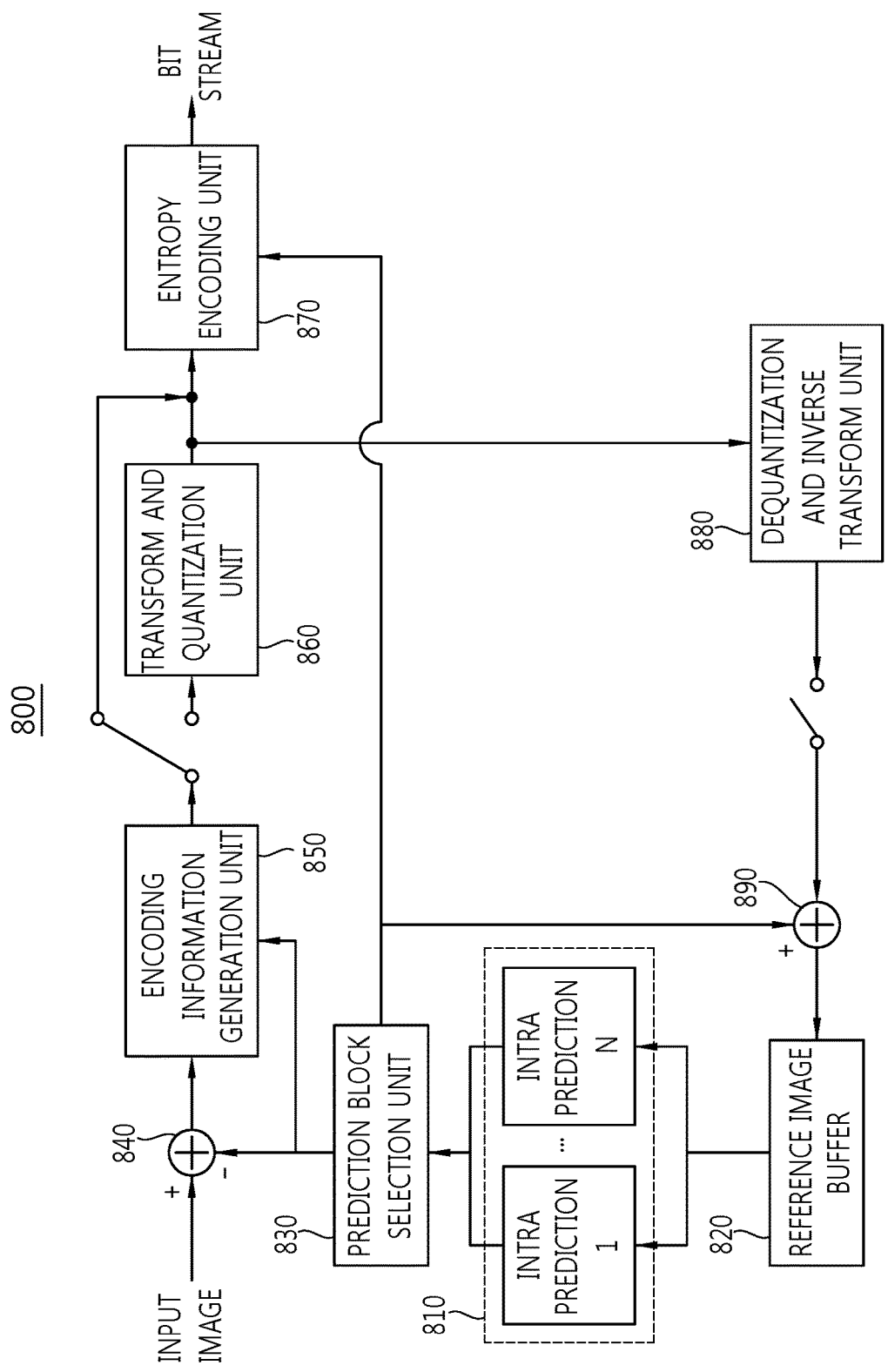
FIG. 8 is a diagram showing a configuration of the encoding apparatus according to the embodiment of the present invention.

FIG. 8 is a diagram showing a configuration of the encoding apparatus according to the embodiment of the present invention.

FIG. 8 further includes the prediction block selection unit in the encoding apparatus of FIG. 2, wherein the operation of the intra prediction unit is different from the intra prediction unit of FIG. 2. Therefore, the description of the repeated portion with FIG. 2 among components of FIG. 8 will be omitted and the prediction block selection unit and the intra prediction unit will be mainly described.

Referring to FIG. 8, an encoding apparatus 800 may include an intra prediction unit 810, a reference image buffer 820, a prediction block selection unit 830, a subtraction unit 840, an encoding information generation unit 850, a conversion and quantization unit 860, an entropy encoding unit 870, a dequantization and inverse transform unit 880, and an adding unit 890.

The intra prediction unit 810 may generate more than one prediction block of the current blocks by using the reference image stored in the reference image buffer 820. In this case, the intra prediction unit 810 may generate the prediction blocks of the current blocks according to the predefined methods for generating a plurality of prediction blocks based on the number of the methods for generating prediction blocks used at the time of generating the prediction blocks of the peripheral blocks or the method for generating prediction blocks used at the time of generating the prediction blocks of each of the recovered peripheral blocks.

For example, when the methods for generating prediction blocks used at the time of generating the prediction blocks of the peripheral blocks are the same, the intra prediction unit 810 may generate the prediction blocks of the current blocks according to the method for generating the prediction blocks of the peripheral blocks equally used. In other words, when the prediction blocks of the peripheral blocks are generated according the intra prediction method 1, the intra prediction unit 810 may generate the prediction blocks of the current blocks by using the reference image according to the intra prediction method 1. Then, the prediction block selection unit 830 may output the prediction blocks of the generated current blocks as they are since the prediction block of the generated current blocks is one.

As another example, when the number of methods for generating the prediction blocks used at the time of generating the prediction blocks of the peripheral blocks is two or less, the intra prediction unit 810 may generate the prediction blocks of the current blocks according to the two methods for generating two prediction blocks used at the time of generating the prediction blocks of the peripheral blocks.

Then, the prediction block selection unit 830 may select the prediction block having good encoding efficiency among the two prediction blocks of the current blocks. For example, the prediction block selection unit 830 may select the prediction block having good encoding efficiency by using the similarity between the prediction blocks of the current blocks and the current blocks, rate-distortion cost, or the like. Further, the prediction block selection unit 830 may generate the prediction block selection information including the information representing the method for generating prediction blocks used at the time of generating prediction blocks of the selected current blocks. In this case, the prediction block selection unit 830 may calculate the similarity by using SAD, SSD, SATD, or the like.

As another example, when the number of methods for generating prediction blocks used at the time of generating the prediction blocks of the peripheral blocks is three or more, the intra prediction unit 810 may generate a plurality of prediction blocks of the current blocks according to the predefined methods for generating a plurality of prediction blocks. For example, when the methods for generating prediction blocks (1) to (5) described in the intra prediction unit 210 are used, the intra prediction unit 810 may generate 5 prediction blocks of the current blocks using the 5 predefined methods for generating prediction blocks.

In other words, when the methods for generating prediction blocks used at the time of generating the prediction blocks of the peripheral blocks are three or more, the intra prediction unit 810 may generate the prediction blocks of the current blocks by using the predefined methods for generating a plurality of prediction blocks instead of the method for generating prediction blocks used at the prediction blocks of the peripheral blocks.

Then, the prediction block selection unit 830 may select any one of the prediction blocks having the best encoding efficiency among the prediction blocks of the current blocks. Further, the prediction block selection unit 830 may generate the prediction block selection information including the information representing the method for generating prediction blocks used at the time of generating prediction blocks of the selected current blocks.

The subtraction unit 840 may subtract the prediction blocks of the selected current blocks and the current blocks to generate the residual blocks.

The encoding information generation unit 850 may generate the encoding information based on whether the residual blocks are encoded. As an example, in order to determine whether the residual blocks are encoded or not, the similarity between the current blocks and the prediction blocks of the current blocks, or the like, may be used.

Herein, the encoding information may include information representing whether the residual blocks are encoded or not.

Then, the transform and quantization unit 860 may transform and quantize the residual blocks based on the encoding information.

The entropy encoding unit 870 performs the entropy encoding on at least one of the encoding information, the prediction block selection information, and the residual blocks. For example, when the residual blocks are not encoded, the entropy encoding unit 870 may encode the encoding information and the prediction block selection information to be output as the bitstreams. Further, when the residual blocks are encoded, the encoding information, the prediction block selection information, and the residual blocks are subjected to the entropy encoding to be output as the bitstreams.

The dequantization and inverse transform unit 880 may perform the dequantization and the inverse transform on the transformed and quantized residual blocks to recover the residual block.

The adding unit 890 may recover the current block by adding the residual blocks recovered based on the encoding information and the prediction blocks of the selected current blocks. Then, the reference image buffer 820 may store the recovered current block. In this case, when the residual blocks are not encoded, the adding unit 890 may recover the current blocks by using only the prediction blocks of the selected current blocks.

Figure 9:
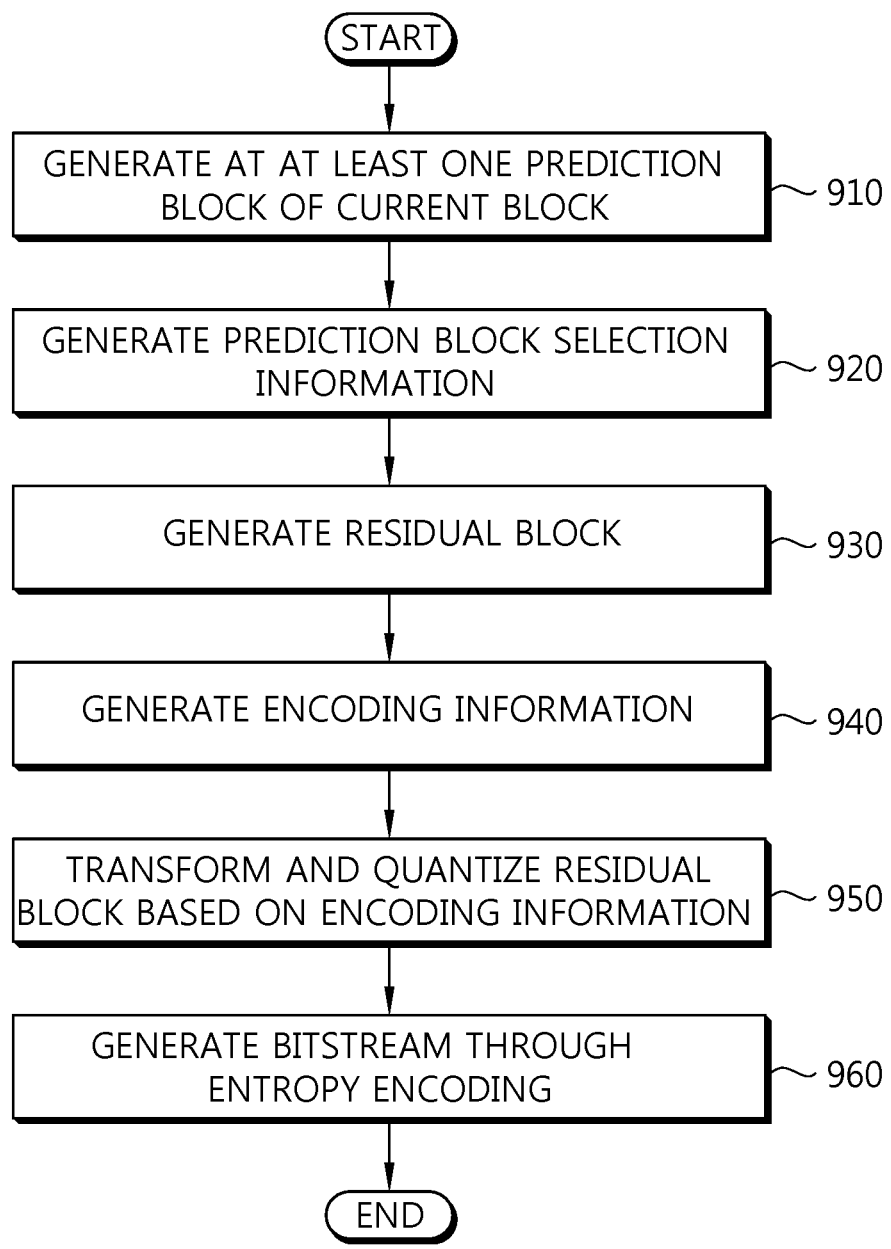
FIG. 9 is a flow chart for describing an operation of the encoding apparatus according to the embodiment of the present invention.

FIG. 9 is a flow chart for describing an operation of the encoding apparatus according to the embodiment of the present invention.

First, at S910, the prediction block generation unit 810 may generate at least one prediction block of the current block using the reference image.

For example, the intra prediction unit 810 may generate the prediction blocks of the current blocks according to the method for generating prediction blocks used at the time of generating the prediction blocks of each of the plurality of recovered peripheral blocks.

As another example, the intra prediction unit 810 may generate the plurality of prediction blocks of the current blocks according to the predetermined methods for generating the plurality of prediction blocks based on the number of the methods for generating the prediction blocks used at the time of generating the prediction blocks of the peripheral blocks.

Then, at S920, the prediction block selection unit 820 may select any one of the prediction blocks of the current blocks according to the generation of the prediction blocks of the plurality of current blocks.

In this case, the prediction block selection unit 820 may select the prediction blocks having the best encoding efficiency among the prediction blocks of the current blocks.

For example, when the similarity between the current blocks and the generated current blocks are used, it may be determined that prediction blocks with the increased similarity have good encoding efficiency. Therefore, the prediction block selection unit 820 may select the prediction blocks having the highest similarity among the prediction blocks of the current blocks.

As another example, the prediction block selection unit 820 may select the prediction blocks having the best encoding efficiency by using the rate-distortion cost.

Further, at S930, the subtracting unit 840 may subtract the prediction blocks of the selected current blocks and the current blocks to generate the residual blocks.

Next, at S940, the encoding information generation unit 850 may generate the encoding information based on whether the residual block is encoded.

Further, at S950, the transform and quantization unit 860 may transform and quantize the residual block based on the encoding information.

Then, at S960, the entropy encoding unit 870 may perform the entropy encoding on at least one of the encoding information, the prediction block selection information, and the residual blocks.

For example, when the residual blocks are encoded, the entropy encoding unit 870 performs the entropy encoding on each of the encoding information, the prediction block selection information, and the transformed and quantized residual blocks and mixes the encoded information, the encoded prediction block selection information, and the encoded residual blocks to be output as the bitstreams.

Figure 10:
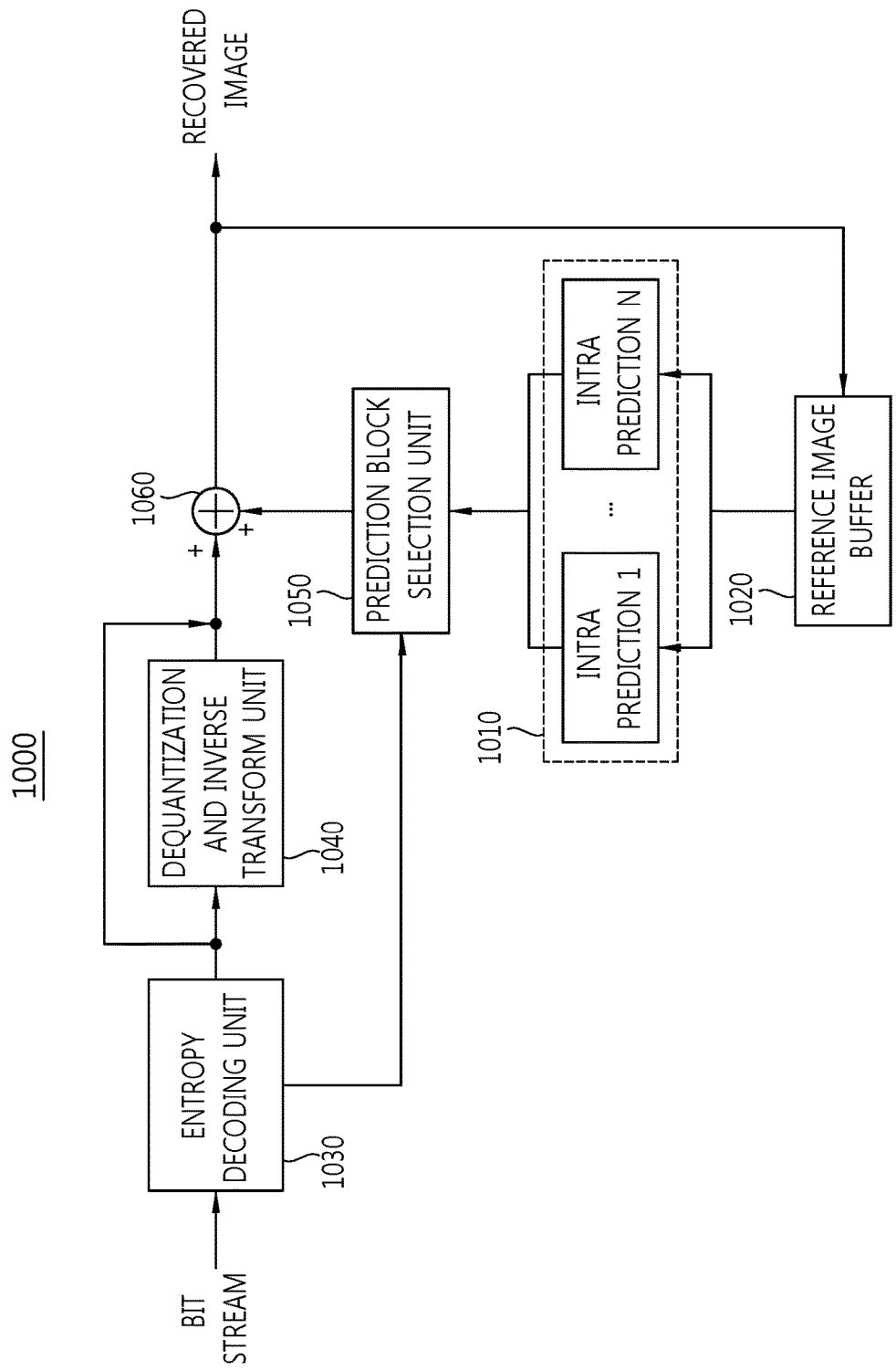
FIG. 10 is a block diagram showing a configuration of the decoding apparatus according to the embodiment of the present invention.

FIG. 10 is a block diagram showing a configuration of the decoding apparatus according to the embodiment of the present invention.

A decoding apparatus 1000 of FIG. 10 may further include a prediction block selection unit 1050 in the decoding apparatus 500 of FIG. 5. Therefore, components of FIG. are substantially the same as the components mentioned with reference to the operation of FIG. 5 and therefore, the repeated description thereof will be omitted.

Referring to FIG. 10, a decoding apparatus 1000 may include an intra prediction unit 1010, a reference image buffer 1020, an entropy decoding unit 1030, a dequantization and inverse transform unit 1040, and an adding unit 1060.

The intra prediction unit 1010 may generate the prediction blocks of the current blocks based on a reference image stored in the reference image buffer 1020.

For example, the intra prediction unit 1010 may generate the prediction blocks of the current blocks according to the method for generating prediction blocks used at the time of generating the prediction blocks of each of the plurality of recovered peripheral blocks.

As another example, the intra prediction unit 1010 may generate the plurality of prediction blocks of the current blocks according to the predetermined methods for generating the plurality of prediction blocks based on the number of the methods for generating the prediction blocks used at the time of generating the prediction blocks of the peripheral blocks. Here, as the methods for generating a plurality of prediction blocks, the predefined method for generating the prediction blocks (1) to (5) described in the intra prediction unit 210 of FIG. 2 may be used.

The entropy decoding unit 1030 may demultiplex the bitstreams to extract at least one of the encoded information, the encoded residual blocks, and the encoded prediction block selection information. Further, the entropy decoding unit 1030 may perform the entropy decoding on the encoded information, the encoded residual blocks, and the encoded prediction block selection information.

For example, when the encoding information includes the information representing that the residual blocks are not encoded, the entropy decoder 1030 may perform the entropy decoding on only the encoded information and the encoded prediction block selection information.

As another example, when the encoding information includes the information representing that the residual blocks are encoded, the entropy decoder 1030 may perform the entropy decoding on all of the encoded information and the encoded residual blocks, and the encoded prediction block selection information.

The prediction block selection unit 1050 may select any one of at least one prediction block generated based on the prediction block selection information.

The dequantization and inverse transform unit 1040 perform the dequnatization and the inverse transform on the residual blocks encoded based on the encoding information.

For example, when the encoding information includes the information representing that the residual blocks are encoded, the dequantization and inverse transform unit 1040 performs the dequantization on the encoded residual block and then performs the inverse transform thereon, thereby recovering the residual block. In this case, when the encoding information includes the information representing that the residual blocks are not encoded, the operation of the dequantization and inverse transform unit 1040 may be omitted.

The adding unit 1060 may recover the current block by using at least one of the recovered residual blocks and the prediction blocks of the selected current blocks.

For example, when the residual blocks are recovered due to the encoding information including the information representing that the residual blocks are encoded, the adding unit 1060 may recover the current blocks by adding the recovered residual blocks and the prediction blocks of the selected current blocks.

As another example, when the encoding information includes the information that the residual blocks are not encoded, when the operation of the dequantization and inverse transform unit is omitted, the adding unit 1060 may recover the current blocks by using the prediction blocks of the selected current blocks. Then, the recovered image configured by only the prediction blocks of the current blocks may be displayed.

Then, the reference image buffer 1020 may store the recovered current blocks.

FIG. 11 is a flow chart for describing an operation of the decoding apparatus according to the embodiment of the present invention.

First, at S1110, the intra prediction unit 1010 may generate at least one prediction block of the current blocks.

For example, the intra prediction unit 1010 may generate the prediction blocks of the current blocks according to the method for generating prediction blocks used at the time of generating the prediction blocks of each of the plurality of recovered peripheral blocks.

As another example, the intra prediction unit 1010 may generate the plurality of prediction blocks of the current blocks according to the predetermined methods for generating the plurality of prediction blocks based on the number of the methods for generating the prediction blocks used at the time of generating the prediction blocks of the peripheral blocks.

Then, at S1120, the entropy decoding unit 1030 may demultiplex the bitstreams to extract the encoded information and the encoded prediction block selection information and may perform the entropy decoding on the encoded information and the encoded prediction block selection information.

In this case, when the encoding information includes the information representing that the residual block is encoded, the entropy decoding unit 1030 may extract the encoded residual block from the bitstreams through the demultiplexing to perform the entropy decoding.

Then, at S1130, the dequantization and inverse transform unit 1040 may perform the dequantization and inverse transform on the encoded residual blocks to recover the residual blocks.

Then, at S1140, the prediction block selection unit 1050 may select any one of the prediction blocks of at least one current block based on the prediction block selection information.

At S1150, the adding unit 1060 may recover the current blocks using at least one of the prediction blocks of the selected current blocks and the recovered residual blocks. Then, the reference image buffer 1020 may store the recovered current blocks.

As another example, when the encoding information includes the information that the residual blocks are not encoded, when the operation of the dequantization and inverse transform unit 1040 is omitted, the adding unit 1060 may recover the current blocks by using only the prediction blocks of the selected current blocks. In other words, since the encoded residual blocks are not included in the bitstreams, there are no recovered residual blocks. Therefore, the recovered image may be configured by using only the prediction blocks of the current blocks selected based on the prediction block selection information.

As another example, when the encoding information includes the information representing that the residual blocks are encoded, when the residual block is recovered, the adding unit 1060 may recover the current block by adding the selected prediction blocks of the current blocks and the recovered residual blocks.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

The invention claimed is:

1. A video encoding method comprising:
generating a prediction block for a current block by performing prediction for the current block;
generating transformed and quantized residual block information based on a residual block which is generated using the prediction block for the current block; and
generating a reconstructed block for the current block,
wherein for decoding for the current block using the transformed and quantized residual block information, a first prediction block for the current block is generated based on a prediction block generation method for the current block,
wherein for the decoding for the current block, the prediction block generation method for the current block is determined based on a plurality of prediction block generation methods for a plurality of adjacent blocks which are spatially adjacent to the current block,
wherein for the decoding for the current block, the plurality of prediction block generation methods for the plurality of adjacent blocks are used to generate a plurality of second prediction blocks for the plurality of adjacent blocks, respectively,
wherein for the decoding for the current block, the prediction block generation method for the current block is determined based on the number of one or more different values of the plurality of prediction block generation methods for the plurality of adjacent blocks,
wherein the first prediction block for the current block is equal to a specific decoded block indicated by difference information,
wherein a bitstream comprising the difference information is generated,
wherein the difference information indicates a position difference from a position of the current block to a position of the specific decoded block,
wherein a size of the first prediction block is 16×16, and
wherein a size of the specific decoded block is 16×16.

2. The video encoding method of claim 1, further comprising:
generating selection information indicating the prediction block generation method for the current block used to generate the first prediction block for the current block.

3. The video encoding method of claim 1,
wherein for the decoding for the current block, the prediction for the current block and predictions for the plurality of adjacent blocks are intra predictions, and
wherein for the decoding for the current block, the prediction block generation method for the current block is determined based on how many different intra prediction modes are used for intra predictions for the plurality of adjacent blocks.

4. The video encoding method of claim 1,
wherein for the decoding for the current block, whether all of values of the plurality of prediction block generation methods for the plurality of adjacent blocks are equal or not is determined, and
wherein for the decoding for the current block, the prediction block generation method for the current block is determined based on whether all of the values of the plurality of prediction block generation methods for the plurality of adjacent blocks are equal or not.

5. The video encoding method of claim 1,
wherein the specific decoded block is restricted to be comprised in a decoded region of a current picture comprising the current block.

6. The video encoding method of claim 1,
wherein a plurality of third prediction blocks are generated based on the plurality of prediction block generation methods for the plurality of adjacent blocks, respectively, and
wherein the first prediction block for the current block is generated based on the plurality of third prediction blocks.

7. A video decoding method using a bitstream, the method comprising:
generating a first prediction block for a current block by performing prediction for the current block; and
generating a reconstructed block for the current block based on the first prediction block for the current block,
wherein the first prediction block for the current block is generated based on a prediction block generation method for the current block,
wherein the prediction block generation method for the current block is determined based on a plurality of prediction block generation methods for a plurality of adjacent blocks which are spatially adjacent to the current block,
wherein the plurality of prediction block generation methods for the plurality of adjacent blocks are used to generate a plurality of second prediction blocks for the plurality of adjacent blocks, respectively,
wherein the prediction block generation method for the current block is determined based on the number of one or more different values of the plurality of prediction block generation methods for the plurality of adjacent blocks,
wherein the first prediction block for the current block is equal to a specific decoded block indicated by difference information,
wherein the bitstream comprises the difference information,
wherein the difference information indicates a position difference from a position of the current block to a position of the specific decoded block,
wherein a size of the first prediction block is 16×16, and
wherein a size of the specific decoded block is 16×16.

8. The video decoding method of claim 7, further comprising:
obtaining selection information from the bitstream, wherein
the selection information indicates the prediction block generation method for the current block used to generate the first prediction block for the current block.

9. The video decoding method of claim 7,
wherein the prediction for the current block and predictions for the plurality of adjacent blocks are intra predictions, and
wherein the prediction block generation method for the current block is determined based on how many different intra prediction modes are used for intra predictions for the plurality of adjacent blocks.

10. The video decoding method of claim 7,
wherein whether all of intra prediction modes of the plurality of adjacent blocks are equal or not is determined, and
wherein the prediction block generation method for the current block is determined based on whether all of the intra prediction modes of the plurality of adjacent blocks are equal or not.

11. The video decoding method of claim 7,
wherein whether all of values of the plurality of prediction block generation methods for the plurality of adjacent blocks are equal or not is determined, and
wherein the prediction block generation method for the current block is determined based on whether all of the values of the plurality of prediction block generation methods for the plurality of adjacent blocks are equal or not.

12. The video decoding method of claim 7,
wherein the specific decoded block is restricted to be comprised in a decoded region of a current picture comprising the current block.

13. The video decoding method of claim 7,
wherein a plurality of third prediction blocks are generated based on the plurality of prediction block generation methods for the plurality of adjacent blocks, respectively, and
wherein the first prediction block for the current block is generated based on the plurality of third prediction blocks.

14. The video decoding method of claim 13,
wherein the first prediction block is generated using for a weighted sum of the plurality of third prediction blocks.

15. A non-transitory computer-readable medium for storing a bitstream for decoding a video, the bitstream comprising:
difference information,
wherein a residual block is generated,
wherein a reconstructed block for a current block is generated based on the residual block and a first prediction block for the current block,
wherein the first prediction block for the current block is generated by performing prediction for the current block,
wherein the first prediction block is generated based on a prediction block generation method for the current block,
wherein the prediction block generation method for the current block is determined based on a plurality of prediction block generation methods for a plurality of adjacent blocks which are spatially adjacent to the current block,
wherein the plurality of prediction block generation methods for the plurality of adjacent blocks are used to generate a plurality of second prediction blocks for the plurality of adjacent blocks, respectively,
wherein the prediction block generation method for the current block is determined based on the number of one or more different values of the plurality of prediction block generation methods for the plurality of adjacent blocks,
wherein the first prediction block for the current block is equal to a specific decoded block indicated by the difference information,
wherein the difference information indicates a position difference from a position of the current block to a position of the specific decoded block,
wherein a size of the first prediction block is 16×16, and
wherein a size of the specific decoded block is 16×16.

16. The non-transitory computer-readable medium of claim 15, wherein the bitstream further comprising:
selection information indicating the prediction block generation method for the current block used to generate the first prediction block for the current block.

17. The non-transitory computer-readable medium of claim 15,
wherein the prediction for the current block and predictions for the plurality of adjacent blocks are intra predictions, and
wherein the prediction block generation method for the current block is determined based on how many different intra prediction modes are used for intra predictions for the plurality of adjacent blocks.

18. The non-transitory computer-readable medium of claim 15,
wherein whether all of values of the plurality of prediction block generation methods for the plurality of adjacent blocks are equal or not is determined, and
wherein the prediction block generation method for the current block is determined based on whether all of the values of the plurality of prediction block generation methods for the plurality of adjacent blocks are equal or not.

19. The non-transitory computer-readable medium of claim 15,
wherein the specific decoded block is restricted to be comprised in a decoded region of a current picture comprising the current block.

20. The non-transitory computer-readable medium of claim 15,
wherein a plurality of third prediction blocks are generated based on the plurality of prediction block generation methods for the plurality of adjacent blocks, respectively, and
wherein the first prediction block for the current block is generated based on the plurality of third prediction blocks.

* * * * *